US006446880B1

(12) United States Patent
Schram et al.

(10) Patent No.: US 6,446,880 B1
(45) Date of Patent: Sep. 10, 2002

(54) REPLACEABLE RESERVOIR FOR AN ATOMIZING APPARATUS

(75) Inventors: David J. Schram, Racine County, WI (US); John A. Boticki, Racine County, WI (US); Maryann Jashinske, Racine County, WI (US); Edward J. Martens, III, Racine County, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/630,882

(22) Filed: Aug. 2, 2000

(51) Int. Cl.[7] .............................................. A01G 27/00

(52) U.S. Cl. .......................... 239/145; 239/35; 239/45; 239/46; 239/47; 239/326; 239/338; 222/570

(58) Field of Search ........................... 239/45, 145, 44, 239/46, 47, 55, 35, 600, 326, 338; 222/570; 215/341, 343, 346, 45; 220/304, 795, 300, 301, 293, 378

(56) References Cited

U.S. PATENT DOCUMENTS

| | | | | | |
|---|---|---|---|---|---|
| 3,799,731 | A | | 3/1974 | Novak | |
| 4,255,826 | A | * | 3/1981 | Boyd | 15/21 |
| 4,301,093 | A | | 11/1981 | Eck | |
| 4,334,531 | A | | 6/1982 | Reichl et al. | |
| 4,479,609 | A | | 10/1984 | Maeda et al. | |
| 4,732,321 | A | * | 3/1988 | Dolan | 239/45 |
| 4,739,928 | A | | 4/1988 | O'Neil | |
| 4,793,339 | A | | 12/1988 | Matsumoto et al. | |
| 4,878,615 | A | * | 11/1989 | Losi | 239/45 |
| 4,892,711 | A | * | 1/1990 | Tendick, Sr. | 239/54 |
| 4,919,312 | A | | 4/1990 | Beard et al. | |
| 5,000,383 | A | * | 3/1991 | van der Heijden | 239/47 |
| 5,037,013 | A | | 8/1991 | Howlett | |
| 5,038,394 | A | * | 8/1991 | Hasegawa et al. | 392/395 |
| 5,164,740 | A | | 11/1992 | Ivri | |
| 5,196,171 | A | | 3/1993 | Peltier | |
| 5,335,830 | A | | 8/1994 | Cater | |
| 5,348,189 | A | | 9/1994 | Cater | |
| 5,501,033 | A | * | 3/1996 | Welfer | 43/131 |
| 5,529,055 | A | | 6/1996 | Gueret | |
| 5,586,550 | A | | 12/1996 | Ivri et al. | |
| 5,758,637 | A | | 6/1998 | Ivri et al. | |
| 5,909,845 | A | * | 6/1999 | Greatbatch et al. | 239/44 |
| 5,916,493 | A | | 6/1999 | Miller | |
| 5,927,618 | A | | 7/1999 | Jeffries et al. | |
| 6,010,333 | A | | 1/2000 | Tendick | |
| 6,014,970 | A | | 1/2000 | Ivri et al. | |
| 6,079,634 | A | | 6/2000 | Noakes | |
| 6,189,259 | B1 | * | 2/2001 | Soller | 43/131 |
| 6,223,465 | B1 | * | 5/2001 | Soller et al. | 43/131 |
| 6,296,196 | B1 | * | 10/2001 | Denen et al. | 239/102.1 |

FOREIGN PATENT DOCUMENTS

| | | |
|---|---|---|
| DE | 44 12 913 C1 | 9/1995 |

* cited by examiner

*Primary Examiner*—Lesley D. Morris
*Assistant Examiner*—Dinh Q. Nguyen

(57) ABSTRACT

There is described, in conjunction with a vibrating orifice plate type atomizing dispenser, a refill reservoir which has a wick mounted in a unitary wickholder to provide precise locating of the wick in relation to the vibrating orifice plate in the dispenser. There are also described a novel reservoir overcap and wickholder construction in which mating tubular surfaces on these elements telescope together to ensure a good liquid seal without interfering with the wick. There is also described a novel camming arrangement which enables the overcap to be removed easily from the reservoir.

39 Claims, 5 Drawing Sheets

REPLACEABLE RESERVOIR FOR AN ATOMIZING APPARATUS

BACKGROUND OF THE INVENTION

1. Field of the Invention

This invention relates to vibratory type liquid atomizing devices and more particularly it concerns novel replaceable reservoirs for holding liquids to be atomized in such devices.

2. Description of the Related Art

Vibratory type liquid atomizing devices are shown and described in U.S. Pat. No. 5,164,740, U.S. Pat. No. 5,586,550 and U.S. Pat. No. 5,758,637, among others. In general, these atomizing devices comprise an orifice plate which is caused to vibrate while liquid to be atomized is supplied to one side of the plate. The vibrations of the plate cause the liquid to be forced through minute orifices in the plate and then to be ejected from the other side of the plate in the form of fine droplets.

Atomizing devices of this type are used for a variety of purposes including, for example, the dispensing of air fresheners and insect repellants. In general the service life of these atomizing devices is much longer than the time needed to dispense the liquid which they contain. Accordingly, it is desired to provide practical and inexpensive liquid replacement containers or reservoirs which can easily be substituted for an empty reservoir in the atomizing device.

U.S. Pat. No. 4,739,928 shows a liquid air freshener container having a wick and a removeable cap which covers the wick. A wick holder or insert is fitted into an opening at the top of an upper neck portion of the container. The neck portion is formed with a screw thread for holding the removeable cap; and a flange is formed under the screw thread for mounting the container in an air freshener.

U.S. Pat. No. 4,334,531 shows an inhaler which atomizes liquid from a removeable container. A wick extends from the container to a vibratory atomizing element. A removeable cap covers the container when it is not in use in the inhaler.

U.S. Pat. No. 6,010,333 shows a burner assembly which includes a liquid container and a cap which is removably held onto the container by a screw thread arrangement. The cap holds a wick which extends down into the container.

Other U.S. patents which show containers with wicks are U.S. Pat. No. 3,799,731; U.S. Pat. No. 4,301,093; U.S. Pat. No. 4,479,609; U.S. Pat. No. 4,793,339; U.S. Pat. No. 5,916,493 and U.S. Pat. No. 6,014,970.

One problem which must be addressed in providing replacement bottles or reservoirs for vibratory type atomizing devices is that of precisely positioning the replacement reservoir vertically relative to the vibratory orifice plate. The liquid to be atomized is generally brought to the vibratory plate by means of a capillary element such as a wick. The wick is held by the liquid reservoir and therefore each replacement reservoir or bottle contains its own wick. The wick, however, must be precisely positioned in a vertical direction so that it adequately conveys liquid to the plate while not pressing against the plate so as to interfere appreciably with its vibrations. Therefore the reservoir replacement system must ensure simple but very accurate positioning of the replacement reservoir or bottle relative to the vibrating plate.

Another problem that is encountered in providing replacement reservoirs for vibratory type atomizing devices is that of sealing the reservoirs adequately for long periods of time before they are put into actual use. This is especially difficult because the reservoir wick must not only be precisely positioned, it also must not be subjected to crushing before actual use. This problem is particularly severe in the case where fragrances are to be atomized because the viscosity of many of these fragrances and their ability to wet surfaces which they contact allows them to migrate out through extremely small pores and passageways. Further, while a very secure seal must be provided, it must be easily broken without damaging the wick so that the wick can be precisely positioned when the reservoir is mounted on the atomizer device.

SUMMARY OF THE INVENTION

The present invention, in one aspect, provides a novel refill assembly for a liquid atomizer device. This novel refill assembly comprises a liquid containing reservoir having an upper opening. A wick extends from a liquid in the reservoir and out through the upper opening. At least one lug extends radially outward from the liquid reservoir for engaging a bayonet type slot in an atomizer device. This construction permits the reservoir to be mounted quickly and easily in an atomizer device with the wick being precisely positioned in the atomizer device.

According to another aspect of the invention, there is provided a novel refill assembly which comprises a liquid containing reservoir, such as a bottle, having an upper opening and a wick assembly comprising a plug or wick holder of unitary construction with a center opening through which a wick extends. The wick is held tightly in the center opening of the plug or wickholder. The wickholder is affixed to the reservoir and is sealed around its upper opening with the wick extending down into the reservoir. The wickholder is formed with at least one laterally extending mounting surface for mounting the reservoir and wickholder in an atomizing dispenser whereby the upper end of the wick is precisely located in the dispenser. Because of the unitary construction of the wickholder, the vertical distance between the mounting surface and the top of the wick is precisely controlled and is not subject to variations caused by accumulated tolerances which occur when the wick is held by a different element from that which forms the mounting surface.

In a further aspect, the present invention comprises a novel refill assembly for a liquid atomizer device. This novel refill assembly comprises a liquid containing reservoir having an upper opening through which a wick extends. The reservoir is formed with a first tubular formation which extends downwardly from the opening and which surrounds the wick. A cap, which is removably secured to the reservoir, has a second tubular formation extending down from within the cap. This second tubular formation is closed at its top but is open at its bottom; and it telescopes over the first tubular portion. At least one of the tubular portions is tapered such that the tubular portions form a sealing interference fit when they are in telescoping relationship. In this manner, an effective seal is maintained around the wick so that the refill assembly may be stored for long periods of time without loss of the liquid from evaporation.

According to a still further aspect of the invention, there is provided a novel refill assembly which comprises a liquid containing reservoir, such as a bottle, having an upper opening through which a wick extends. An upper region of the reservoir has a circular cross section and is formed with at least two laterally outwardly extending bayonet type lugs for mounting the reservoir onto an atomizer device. The refill assembly also includes a cap having a skirt. The cap is mounted on the reservoir such that it encloses the wick and such that its skirt extends over the lugs. The skirt and the lugs are formed with laterally extending mating surfaces, at least one of which is slanted relative to a plane perpendicular to an axis of the circular cross section of the upper region of the reservoir. Upon turning the cap relative to the reservoir, the lugs are cammed downwardly to release said cap from said reservoir.

According to yet another aspect of the invention, there is provided a novel plug or wickholder subassembly which comprises a unitary molded plug or wickholder and a wick. The wickholder has an upper wall and a peripheral skirt extending downwardly therefrom for holding the wickholder onto a liquid reservoir. The wickholder also includes attachment lugs which extend laterally outward from the upper wall beyond the skirt. The wick extends up through and is held in an opening in the upper wall.

According to another aspect of the invention there is provided a novel combination plug and wickholder for a liquid reservoir from which liquid may be dispensed in aerosolized form. This novel plug and wickholder comprises a unitary molded body having a circular horizontal wall with an opening extending therethrough through which a wick may extend. A generally cylindrical inner wall extends down from the periphery of the horizontal wall such that the outer surface of the cylindrical inner wall can form, with a tubular portion of a cover, a seal around the wick. The inner wall flares out at the bottom and then extends back up to form a generally cylindrical outer wall whose outer surface can form a seal with the inside of a neck of a liquid reservoir. An annular mounting wall extends laterally out from the upper end of the outer wall to extend over the upper edge of the reservoir neck. An outer skirt extends downwardly from the mounting wall outside the neck of the reservoir. The outer skirt is formed with an internal locking formation which interlocks with a cooperating formation on the outside of the reservoir neck to lock the plug and wickholder to the reservoir.

According to yet another aspect of the invention there is provided a novel method of assembly of a liquid refill reservoir. According to this novel method, a combination plug and wickholder is provided with an upper opening through which a wick may project. Then a cap is attached to the combination plug and wickholder so that a space, which is sealed from the atmosphere, is formed around the wick opening. A wick is inserted into the wick opening either before or after the cap is attached. Liquid is supplied to a reservoir through an opening therein and then the combination plug and wickholder, with the cap attached, is fastened to the reservoir, with said wick extending into the liquid and the combination plug and wickholder forming a seal with the reservoir opening.

A further aspect of the invention involves a novel subcombination which comprises a plug and wickholder of unitary molded construction which can be fastened onto and sealed with an upwardly projecting neck of a liquid reservoir by the application of a downward force on the plug and wickholder. The plug and wickholder supports a wick which extends out through an opening therein. The novel subcombination further includes an overcap cap which is removably attached to the plug and wickholder, said cap being configured to provide a seal with the plug and wickholder around the wick where the wick extends out through the opening. The cap also has a top wall and a tubular wall extending down from said top wall to an upper surface of said plug and wickholder to transmit downward forces applied to the cap, down to the plug and wickholder without affecting the seal.

DETAILED DESCRIPTION OF THE PREFERRED EMBODIMENT

Figure 1:
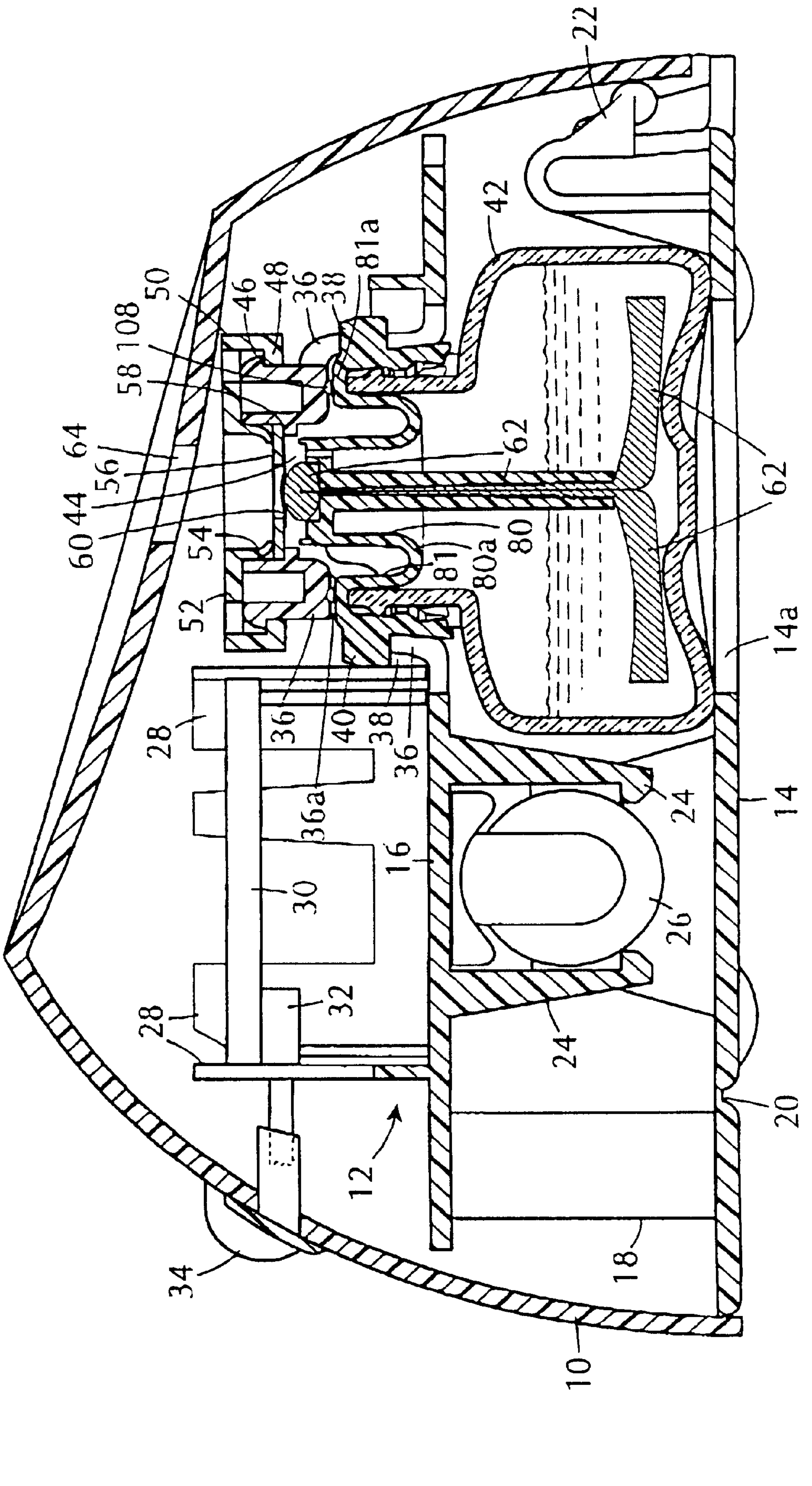
FIG. 1 is an elevational section view of an atomizing device in which the present invention is used.

The atomizing device of FIG. 1 includes an outer shell-like cover 10 of molded plastic and an inner chassis 12 also of molded plastic. The chassis 12 has attached thereto a horizontal bottom cover 14, which constitutes the bottom cover of the atomizing device. The chassis 12 includes a horizontal wall 16. The chassis and the bottom cover are held in spaced apart relationship by posts or spacers 18 near one end. The bottom cover 14 snaps onto the chassis via the posts or spacers 18. The bottom cover 14 has an integrally formed hinge 20 near the spacers 18 so that it can be pivoted downwardly to expose the region between the chassis and the bottom cover. The other end of the bottom cover 14 is provided with a latching mechanism 22 for engaging the outer cover 10 to hold the bottom cover in place. The bottom cover 14 is also formed with a hole or window **14*a*** for viewing the contents of a liquid reservoir within the atomizer device without need to open the bottom cover.

A pair of battery holding lugs 24 extend down from the wall 16 and support an AA battery 26. The wall 16 is formed on the upper surface thereof with upstanding supports 28 which mount a printed circuit board 30. The printed circuit board contains circuits which are connected by leads (not shown) to the battery 26. The circuits on the printed circuit board 30 produce high frequency alternating voltages at various intervals according to the setting of a switch 32 which is also mounted on the printed circuit board. A switch actuator 34, which is moveable from the front of the cover 10, is connected to the switch 32 to permit adjustment of the timing of these intervals.

The wall 16 is also formed with an upwardly extending reservoir support 36 having a pair of diametrically opposed bayonet type slots 38 which accommodate two diametrically opposed connecting lugs 40 which extend radially outward from a liquid refill reservoir or bottle 42. The reservoir or bottle can be removed from the atomizing device by turning it to release the lugs 40 from the bayonet slots 38. The reservoir or bottle 42 has a wick 62 which extends out from its upper end and which conveys liquid from the reservoir by capillary action to the bottom of the orifice plate 60.

The upper end of the reservoir support 36 is circular in cross-section and has a center opening 44. The reservoir support 36 is formed with an outwardly projecting snap fit bead 46 which accommodates an inwardly extending flange 48 of a retainer 50. The retainer 50 has an upper horizontal wall 52 from which flexible retainer fingers 54 extend in a downward direction. These fingers press down upon and hold an annularly shaped piezoelectric element 56 onto a shoulder 58 which is formed in the center opening 44 of the reservoir support 36. An orifice plate 60, which contains a plurality of very small orifices or perforations, is affixed, for example by adhesive or solder, to the piezoelectric element 56 so that it extends across the bottom of the center opening of the annular piezoelectric element 56. It should be understood that the orifice plate 60 could also extend across the top of the center opening of the annular piezoelectric element 56.

The upper and lower surfaces of the piezoelectric element 56 are connected by a pair of leads (not shown), which extend through a wire chase in the chassis to the circuits on the printed circuit board 30. These circuits generate the alternating voltages which are applied to the actuator and which cause the actuator to expand and contract in radial directions. This in turn causes the orifice plate 60 to vibrate up and down at high frequency.

In operation of the device, the battery 26 supplies electrical power to electrical circuits on the printed circuit board 30. These circuits produce the high frequency alternating voltages which are supplied to the upper and lower sides of the piezoelectric element 56. The element 56 in turn expands and contracts and causes the orifice plate 60 to vibrate up and down as explained above. Meanwhile, the wick 62, by capillary action, draws liquid from the reservoir 42 up to the bottom of the orifice plate 60. The up and down vibrations of the orifice plate pump this liquid through its orifices and eject it in the form of aerosolized particles from the upper surface of the plate. The ejected liquid exits from the device through an opening 64 in the cover 10.

It is important that the wick 62 be very precisely positioned vertically relative to the orifice plate 60. If the wick is displaced from the orifice plate by an appreciable amount it will not be capable of feeding liquid to be atomized to the plate. On the other hand, if the wick 62 were to press appreciably against the plate 60, it would interfere with the plates' vibration and adversely affect atomization of the liquid. The wick 62, however, is not a part of the atomizing device itself but instead it is a part of the replaceable refill container 42. Thus, in order to position the wick properly with respect to the orifice plate 60, the wick must be accurately positioned in the refill container 42 and the refill container must be mounted very precisely in the reservoir support 36. This is achieved in the present invention by a novel construction of the refill reservoir 42 as can best be seen in FIG. 2.

Figure 2:
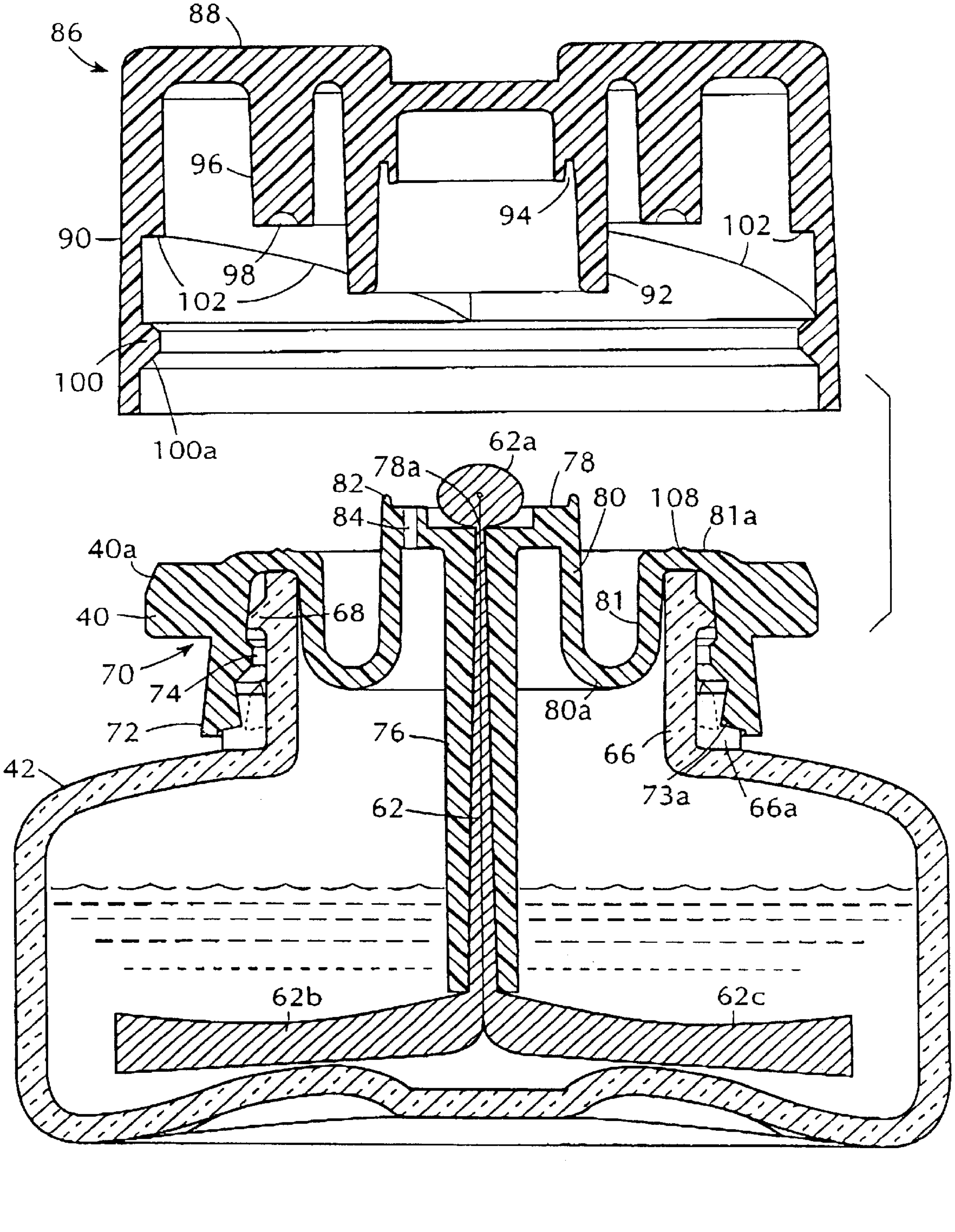
FIG. 2 is an exploded elevational section view showing a refill reservoir and an overcap according to the invention.

Referring now to FIG. 2, it will be seen that the upper end of the reservoir 42 includes an upwardly extending neck 66 having an annular retainer formation 68 which projects outwardly from its outer surface at a location near its upper end. A combination plug and wickholder, 70, of unitary molded construction, extends across the upper end of the neck 66. The plug and wickholder 70 has a peripheral skirt 72 which extends down over the retainer formations 68 on the neck. The skirt 72 itself has a complementary annular retainer formation 74 which extends inwardly from an inner surface thereof to engage with the retainer formation 68 on the reservoir 42. This holds the plug and wickholder 70 securely to the reservoir 42.

The plug and wickholder 70 has a center tube 76 which extends down into the reservoir 42 from a horizontal upper wall 78 of the plug and wickholder. The wick 62 extends through the center tube which keeps the ends of the wick from becoming caught between the plug and wickholder and the reservoir 42 during assembly. This center tube may be circular, square, rectangular or flat in cross-section. The center tube 76 also maintains the wick 62 in contact with the liquid in the reservoir. The wick 62 is looped on itself with a looped end 62*a* exiting from an opening 78*a* in the upper wall 78 and with two single strands 62*b* and 62*c* exiting from the bottom of the center tube 76 near the bottom of the reservoir 42. The looped upper end 62*a* of the wick causes minute fibers thereof to project upwardly from the top of the looped end of the wick. These fibers may lightly touch the orifice plate 60 so that liquid will be brought up to the lower surface of the plate by capillary action. Yet, because of the fineness of the fibers, they do not interfere appreciably with the vibration of the plate. Other wick configurations may be used, for example, where one strand terminates within the tube 76. Still other wick configurations may be used which do not employ a loop As seen in FIG. 2, the connecting lugs 40 project laterally out from and are formed integrally with the combination plug and wickholder 70 so that they form a unitary structure therewith. It will be appreciated that the lugs 40, by their engagement with the bayonet slots 38 in the reservoir support 36 (FIG. 1), establish the vertical positioning of the wick 62 with respect to the orifice plate 60 in the dispensing apparatus. It will be appreciated that the bayonet type mounting arrangement comprising the lugs 40 which extend radially outward from the reservoir 42 enable the reservoir to be mounted quickly and easily in the atomizer device with minimal handling and minimal chance of spillage or leakage. Further, during such mounting, the wick 62 becomes accurately positioned relative to the orifice plate 60 in the atomizer device.

The illustrative embodiment in FIG. 2 also provides a further additional advantage in that because of the unitary molded construction of the combination plug and wickholder 70, the lugs 40 and the horizontal wall 78 through which the wick end 62*a* projects are integrally formed on the same combination plug and wickholder body. Thus, the vertical positioning of the wick with respect to the orifice plate 60 is not subject to accumulated dimensional tolerances that would be encountered in a case where supporting lugs 40 are formed on a different part from the part which supports the wick.

In a preferred process according to this invention, the wick 62 is assembled with the plug and wickholder 70 as a subassembly before the wickholder is affixed to the neck of the reservoir 42. This facilitates manufacture and assembly of the reservoir and allows easy filling and positive sealing of the open end of the reservoir to minimize leakage. That is, the assembly process involves, first, assembly of the wick into the wickholder and then the wickholder, with the wick mounted therein, is assembled to a cap, to be described hereinafter and then this overall assembly is pressed onto the neck 66 of the reservoir 42 after the reservoir has been filled with a liquid to be dispensed. It should be understood, however, that some aspects of this invention may be realized even when the plug and wickholder is not a separate element but is formed as an integral part of the reservoir. Also, in its broadest aspects, the invention may be carried out by assembling the wick 62 with the plug and wickholder 70 after the plug and wickholder has been assembled to the cap.

The combination plug and wickholder 70 includes an inner tubular wall 80 which extends down from the outer peripheral edge of the horizontal wall 78. The outer cylindrical surface of the inner wall 80 serves as a liquid sealing surface which forms a seal with a removable cap to prevent leakage from the wick 62 as will be explained herein. The lower end of the tubular wall 80 flares outwardly at 80*a* and then extends upwardly to form a tubular outer wall 81. The outer cylindrical surface of the outer wall 81 fits tightly against and forms a liquid seal with the inner surface of the neck 66 the reservoir 42.

An annular locating wall 81*a* extends laterally outward from the upper end of the tubular outer wall 81 and over the upper end of the reservoir neck 66. The locating wall 81*a* has a horizontal upper locating surface which abuts a locating surface 36*a* on the chassis, as shown in FIG. 1, to hold the reservoir at a precise position in the atomizer device. The wickholder skirt 72 extends downwardly from the outer edge of the locating wall 81*a*.

The outer surface of the outer tubular wall 81 tapers slightly in a downward direction so that it forms a good liquid seal when it is forced down into the reservoir neck 66. When the combination plug and wickholder 70 is forced down into sealing engagement with the reservoir neck 66, the retainer formation 74 on the skirt 72 engages the retainer formation 68 on the reservoir neck to form a snap fit with and to hold the combination plug and wickholder in very secure sealing relationship with the reservoir 42. There are also provided anti-rotation lugs 73*a* on the skirt 72 which cooperate with corresponding formations 66*a* on the reservoir neck 66 to prevent rotation of the wickholder. This allows one to mount the reservoir in the dispenser of FIG. 1 by turning the reservoir 42 so that the lugs 40 of the wickholder 70 can be rotated into the slots 38 of the support 36 (FIG. 1). The anti-rotation feature also permits a cap to be removed from the reservoir 42 by turning the cap as will be explained.

The circular horizontal wall 78 is also formed with an upwardly extending sealing rim 82 around its upper edge. This sealing ridge, together with the tubular wall 80, provides positive sealing with a cap during a period before the reservoir 42 is actually used in the atomizing device as will be explained hereinafter. In addition, a vent hole 84 extends through the wall 78 to allow air to replace liquid which is dispensed from the reservoir. The vent hole 84 is located in this region so that it remains sealed until the cap is removed. This controls product migration when the cap is in place before the reservoir is mounted in the atomizer device.

A refill container overcap 86 is shown above the refill container 42 in the exploded view of FIG. 2. The overcap 86 comprises a horizontal upper wall 88 and a peripheral downwardly extending outer skirt 90. An inner tubular extension 92 projects downwardly from the upper wall 88. An annular groove 94 is formed around the inner surface of the extension 92 about two thirds of the way up from its lower edge. An outer tubular extension 96, somewhat shorter than the inner extension 92, also extends downwardly from the upper wall 88 and surrounds the inner extension. The lower edge of the outer extension 96 is relieved at 98 to protect projections on the plug and wickholder as will be described.

The outer skirt 90 extends downwardly to a location below the tubular extensions 92 and 96. The outer skirt 90 has an inner diameter which is sufficient to accommodate and extend over and below the lugs 40 of the plug and wickholder 70. An annular retaining bead 100 is formed around the inner surface of the outer skirt 90 near its lower edge. Downwardly facing camming shoulders 102 extend laterally from the inner surface of the skirt 90. These shoulders are slanted downwardly in a direction circumferentially along the skirt 90.

Figure 3:
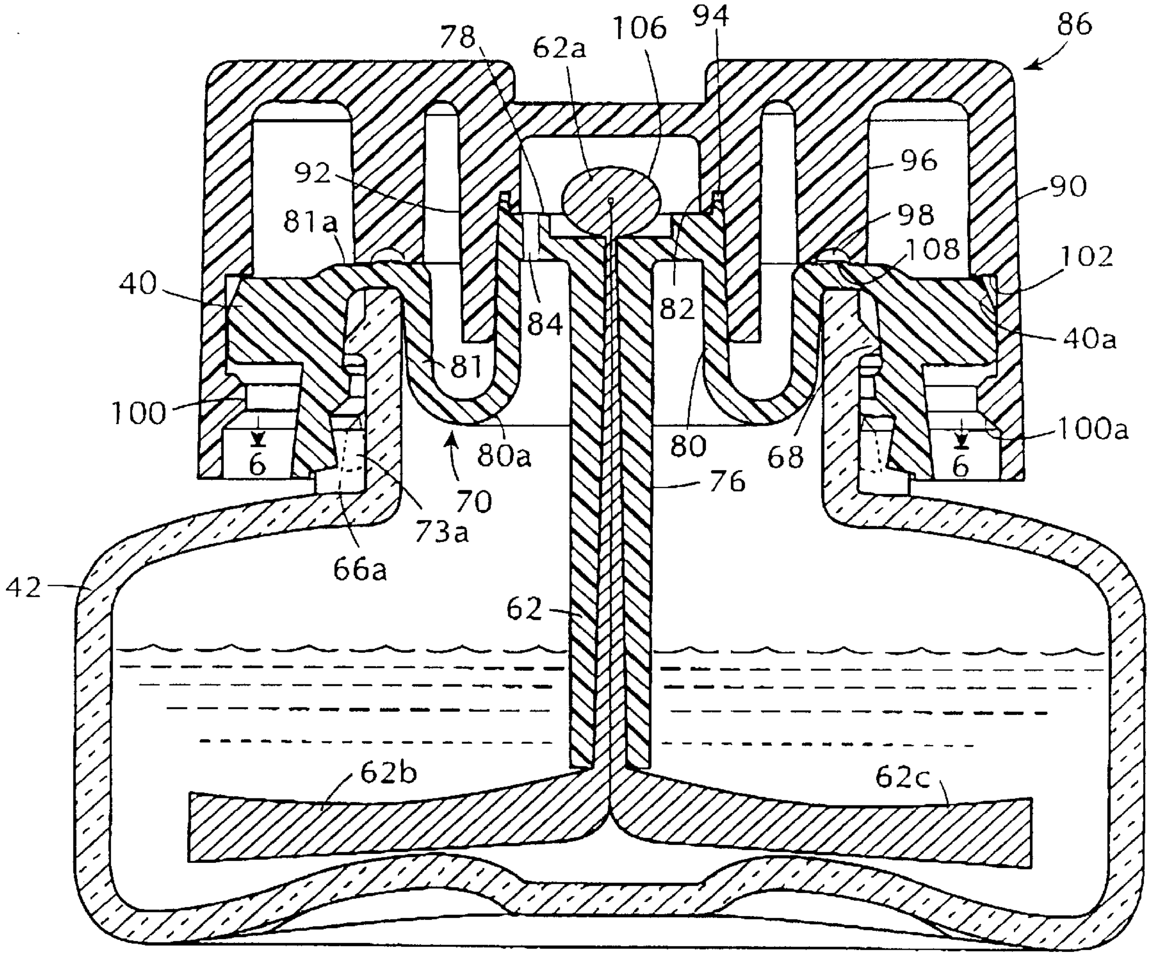
FIG. 3 is a view similar to FIG. 2 and showing the overcap mounted on the reservoir.

FIG. 3 shows the overcap 86 held onto the reservoir 42. As can be seen, the retaining bead 100 on the overcap outer skirt 90 extends inwardly under the lugs 40 and holds the overcap securely onto the reservoir. As mentioned above, the overcap 86 may be first mounted to the subassembly comprising the wick 62 and the plug and wickholder 70; and then this subassembly is pressed down over the reservoir 42 after the reservoir has been filled with a liquid to be atomized. In order to mount the overcap 86 onto the plug and wickholder 70, the overcap is merely pressed down. As will be seen, the upper portion 40*a* of the ends of each of the lugs 40 is tapered. This taper cooperates with a taper 100*a* at the bottom of the retaining bead 100 to allow the retaining bead to be forced over the lugs 40 so that the overcap 86 can be snapped into place. The subassembly comprising the overcap 86 and the plug and wickholder 70 is then mounted on the reservoir 42 by forcing down the subassembly so that the retainer formations 74 on the wickholder skirt 72 snap over the formations 68 on the neck 66 of the reservoir 42 so as to lock the subassembly of the cap and wickholder to the reservoir. Significant downward force is needed because the plug and wickholder must be securely held to the reservoir in a manner that it cannot be removed. However, because of the structure of the overcap 86, its tubular extension 96 presses down on the annular locating wall 81*a* of the plug and wickholder 70 so that significant downward force may be applied to the plug and wickholder without any crushing or distorting force being applied to any liquid sealing surfaces. Thus, these surfaces are protected during assembly.

When the overcap is so held onto the reservoir the inner tubular extension 92 extends over the upper surface of the plug and wickholder 70 and forms a chamber 106 for accommodating the wick upper end 62*a*. Thus, the wick is protected from crushing, which could affect its ability to draw liquid by capillary action and which would also prevent the wick from delivering liquid to the underside of the orifice plate 60 when the reservoir is mounted in the atomizing device of FIG. 1.

The overcap 86 prevents leakage of liquid from the wick end 62*a* in a number of ways. Firstly the inner surface of the inner tubular extension 92 telescopes over the outer surface of the tubular formation 80 of the plug and wickholder 70. One, or preferably both, of these mating surfaces is slightly tapered in a direction toward the cap so as to provide an interference fit so as to effect sealing. In addition, the sealing rim 82 on the upper wall 78 of the wickholder 70 fits closely into the annular groove 94 formed in the inner tubular extension 92 of the overcap 86. The relief 98 at the lower end of the outer tubular extension 96 of the overcap, fits over and protects projections 108 that extend annularly on the upper surface of the plug and wickholder 70. The projections 108 press against a horizontal surface 36*a* of the reservoir support 36 (FIG. 1), to maintain a seal and prevent leakage when the reservoir is mounted in the atomizing device. With these arrangements, the refill reservoir is well sealed against loss of liquid due to migration, spillage and/or evaporation; and at the same time the wick and the projections 108 are protected against crushing prior to insertion in the atomizing dispenser device.

As mentioned above, the retaining bead 100 holds the overcap 86 securely on the refill reservoir 42 and maintains the sealing elements described above in good sealing relationship. Moreover, the retaining bead prevents the overcap 86 from being pulled off from the reservoir inadvertently. In order to remove the overcap when it is desired to mount the refill reservoir 42 in the dispensing device, the overcap 86 is rotated with respect to the reservoir 42. This relative movement causes the upper surfaces of the lugs 40 to move along the slanted camming surfaces 102 formed on the inner surface of the overcap skirt 90. This camming action generates a very large axial force on the overcap which releases the seal connection between the tapered inner surface of the inner tubular extension 92 of the overcap 86 and the tapered outer surface of the tubular formation 80 of the plug and plug and wickholder 70. The camming action also forces the retaining bead 100 up over the ends of the lugs 40 and allows the overcap to be removed from the reservoir 42. These same lugs are then used to hold the container in the dispensing device by the bayonet connection described above.

The bottle or reservoir 42 is preferably made from an acrylonitrile-methyl acrylate copolymer which provides a good gas barrier. This provides a good seal where particularly aggressive liquids, such as fragrances, which tend to migrate, are to be dispensed. For the dispensing of other liquids, different materials may be used.

The plug and wickholder 70 and the overcap 86 are preferably made of polypropylene, although other materials could be used.

Figure 4:
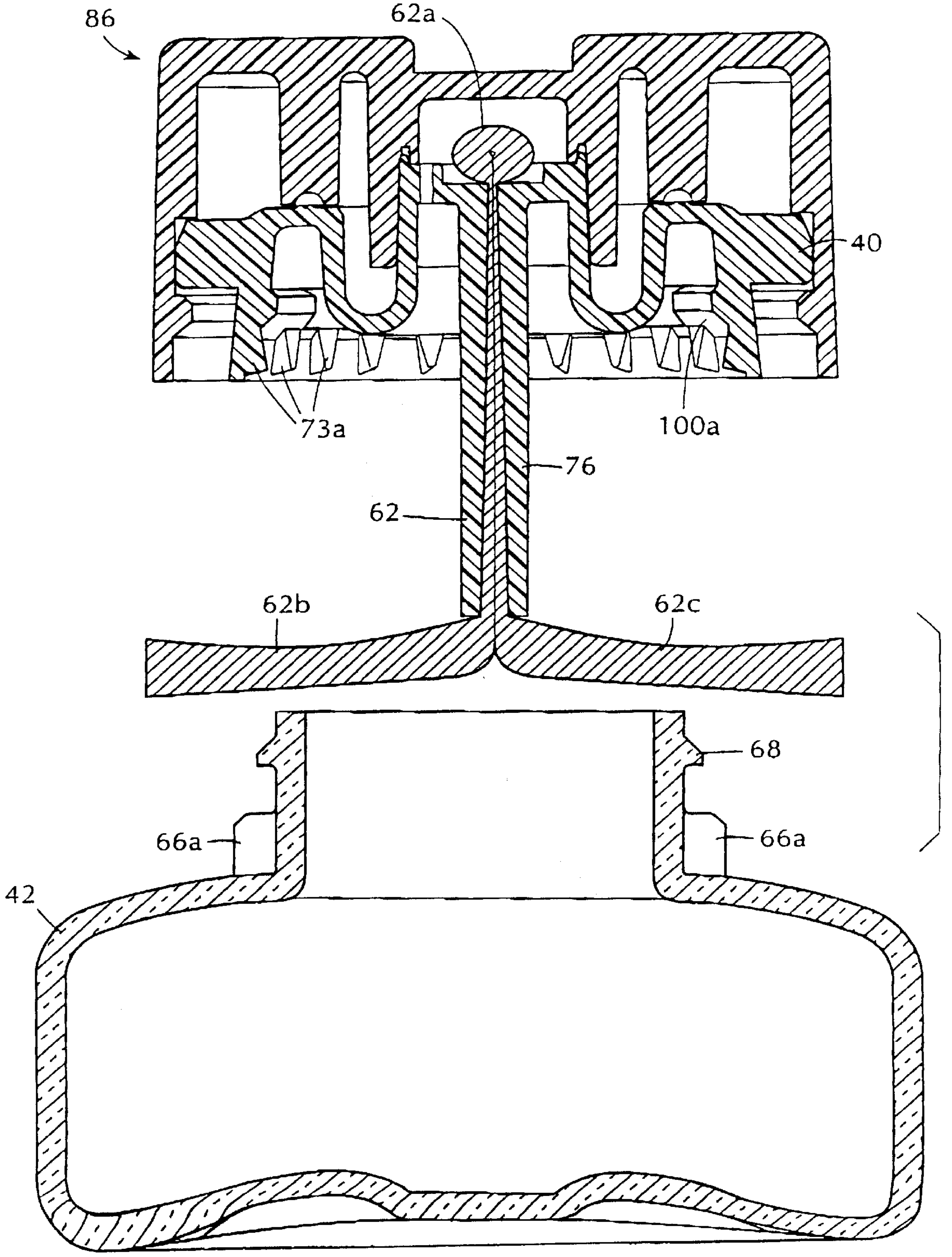
FIG. 4 is an exploded elevational section view showing a refill reservoir together with a subassembly comprising an overcap and a plug and wickholder according to the invention.

In one method of manufacture of the liquid refill reservoir of this invention, the reservoir 42, the combination plug and wickholder 70 and the overcap 86 are each molded from a suitable plastic material. Then the wick 62 is fitted to the combination plug and wickholder 70 so that it extends through the center tube 76 with the looped over portion 62*a* thereof projecting out of the opening 78*a* at the top of the plug and wickholder 70. The overcap 86 is then snapped onto the plug and wickholder 70 as shown in FIG. 4 so that the inner tubular extension 92 of the overcap telescopes down over the inner wall 80 of the plug and wickholder 70 and forms a liquid seal therewith extending around the projecting portion 62*a* of the wick 62, as well as the vent opening 84. It will be appreciated that the outer tubular extension 96 of the overcap 86 abuts the annular locating wall 81*a* of the plug and wickholder 70 to limit the extent of the telescoping movement and to prevent crushing or distortion of the looped wick portion 62*a* in the chamber 106. In another method of manufacture, the wick 62 is fitted to the combination plug and wickholder 70 after the overcap has been snapped onto the plug and wickholder.

The reservoir 42 is then filled with a liquid to be dispensed and the subcombination, consisting of the overcap 86 fitted over the plug and wickholder 70 with the wick 62 extending therein, is placed over the reservoir 42 as shown in FIG. 4, and is thereafter forced down over the neck 66 of the reservoir and sealed in place. As mentioned above, this downward force is transmitted though the outer tubular extension 96 of the overcap is transmitted through the annular locating wall 81*a* of the plug and wickholder 70 so as to avoid any excessive forces at liquid sealing surfaces. This forcing of the overcap and plug and wickholder subassembly causes the plug and wickholder to be firmly locked to the reservoir in a manner that prevents relative rotation with the reservoir and in a manner such that the outer surface of the outer wall 81 forms a tight liquid seal with the inner surface of the reservoir neck 66.

The refill reservoir may then be stored for long durations without loss of liquid due to leakage or evaporation.

Figure 5:
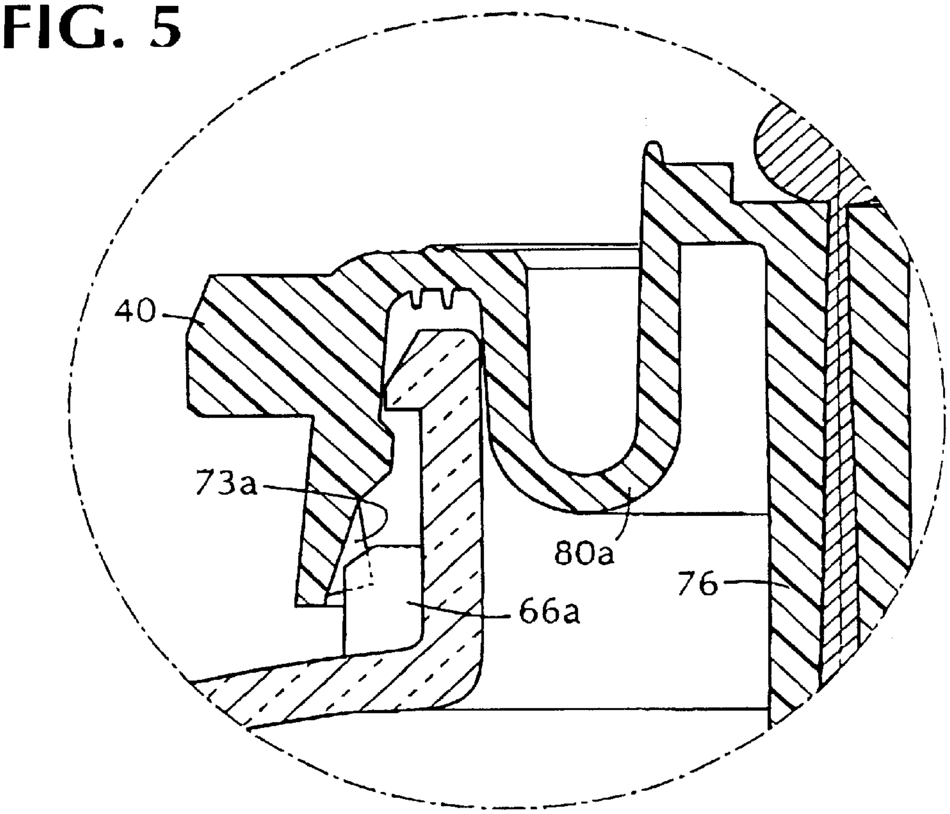
FIG. 5 is an enlarged fragmentary view showing a portion of the subassembly of FIG. 4.
Figure 6:
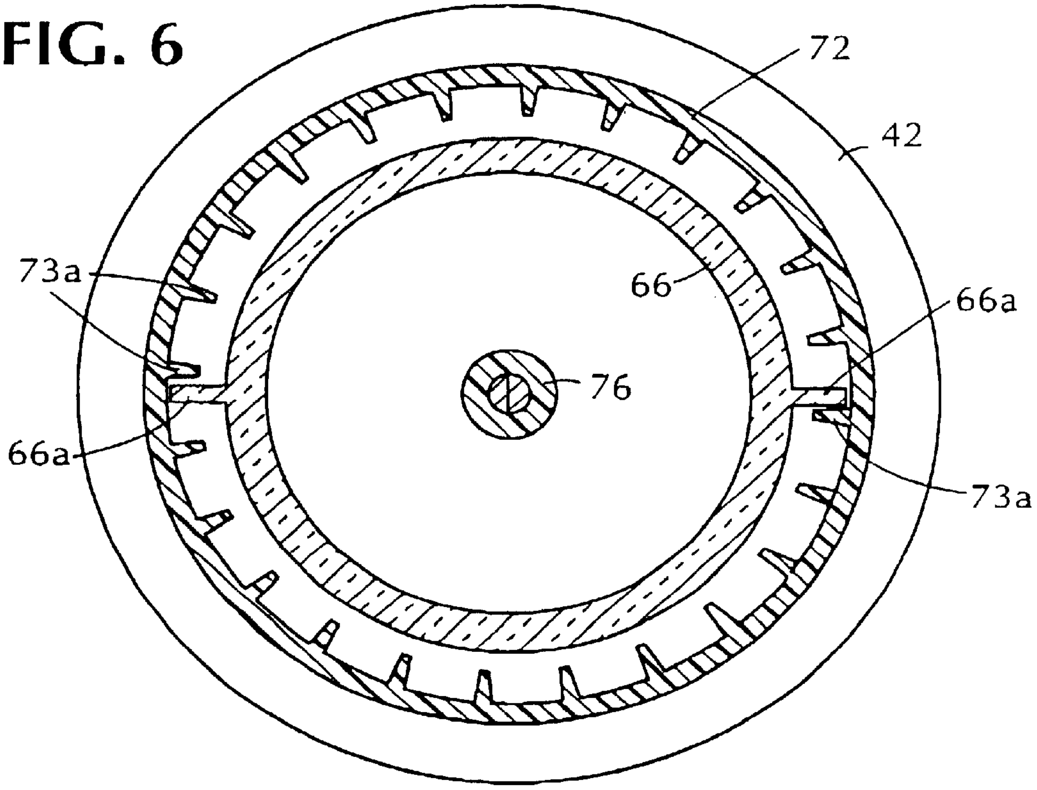
FIG. 6 is a section view taken along line 6—6 of FIG. 3.

As can be seen in FIGS. 5 and 6, there are two formations 66*a* which are formed integrally with and which project radially outward from the lower region of the reservoir neck 66. Also, as can be seen in FIG. 6, the anti-rotation lugs 73*a* are distributed around and extend inwardly from the inner surface of the skirt 72 of the plug and wickholder 70. When the plug and wickholder 70 is forced down and locked with the reservoir 42, the formations 66*a* on the reservoir neck 66 project into spaces between adjacent formations 73*a* on the plug and wickholder skirt so that when the plug and wickholder 70 is mounted onto the reservoir 42, they cannot rotate relative to each other.

When it is desired to replace a liquid reservoir on the atomizing device (FIG. 1), the liquid reservoir 42 is rotated to withdraw the bayonet lugs 40 from their respective slots 38 and permit removal of the reservoir. Then the overcap 86 is removed from a new reservoir 42 by turning it so that the relative rotational movement of the upper surfaces of the lugs 40 on the reservoir 42 and the camming surfaces 102 on the overcap 86 force the overcap off from the reservoir. As mentioned previously, the anti-rotation elements on the combination plug and wickholder 70 and on the reservoir 42 prevent relative rotation between these two elements so that the overcap 86 may be removed by holding the reservoir itself and turning the overcap. The new liquid reservoir is then mounted in the atomizer 10 by pressing it up in the atomizer so that the locating wall 81*a* presses against the locating surface 36*a* in the atomizer device and so that the annular sealing ridges 108 press against the surface 36*a*. The bayonet lugs 40 are then in position to enter the slots 38 and to be secured in place by rotating the reservoir. This precisely positions the projecting end 62*a* of the wick 62 relative to the orifice plate 60 in the atomizer device for effective operation of the device.

INDUSTRIAL APPLICABILITY

The subject invention enables liquid refill reservoirs with wicks to be constructed such that the wick is precisely positioned for accurate placement in an atomizing device which uses a vibrating orifice plate. Moreover, the novel sealing arrangements of this invention enable such liquid refill reservoirs to hold liquids without leakage or loss over long periods of time prior to use in the atomizing device. In addition, the novel arrangements of this invention ensure secure holding the refill reservoir overcap on the reservoir and yet permit easy removal of the overcap when it is desired to mount the reservoir in the atomizing device.

What is claimed is:

1. A refill assembly for a liquid atomizer device, said refill assembly comprising:

a liquid containing reservoir having a wickholder portion with an upper opening;

a wick extending from a liquid contained within said reservoir and out through said upper opening; and a pair of diametrically opposed bayonet type connecting lugs integrally molded with and extending radially outward from said wickholder portion for engaging a bayonet slot in an atomizer device, whereby said reservoir can be mounted quickly and easily in an atomizer device with said wick being precisely positioned therein.

2. A refill assembly for a liquid atomizer device, said refill assembly comprising:

a liquid containing reservoir having an upper opening; and a wick assembly comprising a wick holder of unitary construction and having an upper portion thereof which forms a center opening, and a wick extending upwardly through and held tightly in said center opening by said wickholder;

said wickholder being affixed to said reservoir and sealed around an upper opening thereof with said wick extending down into said reservoir;

said wickholder being integrally formed with a pair of diametrically opposed bayonet type connecting lugs for engaging a bayonet mounting slot in a liquid atomizer device to mount said reservoir and said wick assembly on said atomizer device whereby an upper end of said wick is precisely located in such atomizer device.

3. A refill assembly according to claim 2, wherein annular sealing formations extend around said center opening and comprising sealing ridges that abut a corresponding surface on an atomizer device to effect a liquid seal with such atomizer device.

4. A refill assembly according to claim 2, wherein said center opening is located above said connecting lugs.

5. A refill assembly according to claim 2, wherein a wick support tube extends down from said center opening to a location near the bottom of said reservoir whereby the wick is maintained near the bottom of said reservoir.

6. A refill assembly according to claim 2, wherein said wickholder includes a tubular formation which surrounds and extends downwardly form said center opening and which has a lateral outwardly flaring surface for sealing with and internal tubular surface of a cap.

7. A refill assembly according to claim 6, wherein a horizontal wall extends across said external tubular formation at its upper end and wherein said center opening is provided in said horizontal wall.

8. A refill assembly according to claim 7, wherein said horizontal wall is provided with a vent opening adjacent said center opening.

9. A refill assembly according to claim 2, wherein said wickholder is made of plastic material and is snap fitted onto said reservoir.

10. A refill assembly according to claim 2, wherein said wickholder is affixed to said reservoir in a manner to prevent relative rotation between said wickholder and said reservoir.

11. A refill assembly according to claim 2, wherein said wickholder includes a skirt which extends over a neck on said reservoir, said skirt and neck each being formed with mutually facing cooperative snap fit interlocking formations to hold said wickholder on said reservoir.

12. A refill assembly according to claim 11, wherein said reservoir and wickholder are additionally provided with further mutually engaging formations which are configured to prevent relative rotation between said wickholder and said reservoir.

13. A refill assembly for a liquid atomizer device, said refill assembly comprising:

a liquid containing reservoir having an upper horizontal wall with an opening through which a wick extends, said reservoir being formed with a first tubular formation extending downwardly from the peripheral edge of said horizontal wall and surrounding said wick;

a cap removably secured to said reservoir and extending over an upper end of said wick, said cap having a second tubular formation extending downwardly from within said cap, said second tubular formation being closed at its top and open at its bottom and telescoping over said first tubular portion, said first and second tubular portions having mutually contacting surfaces, at least one of which is tapered in a direction toward said cap such that said tubular portions form a sealing interference fit when they are in telescoping relationship.

14. A refill assembly according to claim 13, wherein said cap includes a chamber which accommodates said wick outside said opening.

15. A refill assembly according to claim 13, wherein said first tubular portion is formed at its upper end with an upwardly extending circumferential lip which engages a downwardly extending circumferential slot in said second tubular formation to provide additional sealing around said wick when said cap is secured to said reservoir.

16. A refill assembly according to claim 15, wherein said lip and said slot are tapered to provide an interference fit with each other.

17. A refill assembly according to claim 13, wherein said first tubular member is formed as a well which surrounds said wick where it exits from said reservoir and wherein a vent hole is formed in said first tubular member and extends from said well back into said reservoir.

18. A refill assembly according to claim 17, wherein an upper portion of said well includes a radially outwardly extending horizontal surface formed on said first tubular member and wherein said vent hole opens out onto said surface.

19. A refill assembly according to claim 13, wherein said first tubular member includes a portion which holds said wick and which extends down inside said reservoir to maintain said wick near the bottom of said reservoir.

20. A refill assembly according to claim 13, wherein said wick is folded over on itself where it extends out through said opening in the upper region of said reservoir.

21. A refill assembly according to claim 20, wherein said wick is formed with two tails within said reservoir.

22. A refill assembly for a liquid atomizer device, said refill assembly comprising:

a liquid containing reservoir having an upper opening through which a wick extends;

said reservoir, in an upper region thereof having a circular cross section and being formed with a pair of diametrically opposed, radially outwardly extending bayonet type lugs for interlocking said reservoir onto an atomizer device;

a cap having a skirt and being mounted on said reservoir to enclose said wick with said skirt extending over said lugs, said skirt on said cap having a bead which fits under said lugs to hold said cap onto said reservoir, said skirt and said lugs being formed with laterally extending mating surfaces, at least one of which is slanted downwardly in a direction circumferentially of the skirt such that upon turning said cap relative to said reservoir, said lugs are cammed downwardly to force said bead on said skirt up and over said lugs to release said cap from said reservoir.

23. A refill assembly according to claim 22, wherein said skirt is formed with an inner bead which extends under said lugs to hold said cap onto said reservoir.

24. A wick and wickholder assembly comprising a unitary molded wickholder having an upper wall and a peripheral skirt extending downwardly therefrom for holding said wickholder onto a liquid reservoir, a pair of diametrically opposed bayonet type attachment lugs extending laterally outward from said upper wall beyond said skirt to hold said wickholder to an atomizer device, and a wick extending up through and held in an opening in said upper wall.

25. An assembly according to claim 24, wherein a center tube extends down from said opening in said upper wall and holds said wick.

26. An assembly according to claim 24, wherein said skirt is formed along an inner surface thereof with a bead for holding the wickholder to a reservoir.

27. An assembly according to claim 26, wherein said skirt is also formed along an inner surface thereof with anti-rotation elements which prevent rotation of said wickholder relative to such reservoir.

28. A combination plug and wickholder for a liquid reservoir from which liquid may be dispensed in aerosolized form, said plug and wickholder comprising a unitary molded body having a circular horizontal wall with an opening extending therethrough through which a wick may extend, a generally cylindrical inner wall extending downwardly from the periphery of said horizontal wall and having a tapered outer surface which can form a seal with a tubular portion of an overcap, said inner wall flaring out at the bottom thereof and then extending back up to form a generally cylindrical outer wall having an outer surface which can form a seal with the inside of a neck of a liquid reservoir, an annular wall extending laterally out from the upper end of said outer wall to extend over the upper edge of such neck of a liquid reservoir, and an outer skirt extending downwardly from said annular wall, said skirt being formed with an internal locking formation which interlocks with a cooperating formation on the outside of such neck to lock the plug and wickholder to said reservoir.

29. The combination of claim 28, wherein the outer surface of said generally cylindrical inner wall is slightly tapered in an upward direction and wherein the outer surface of said generally cylindrical outer wall is slightly tapered in a downward direction.

30. The combination of claim 28, wherein an upper surface of said annular locating wall is horizontal and is formed with sealing ridges which extend around its upper surface.

31. The combination of claim 28, wherein a hollow wick tube extends downwardly from said opening in said circular horizontal wall.

32. The combination of claim 28, wherein a pair of diametrically opposed bayonet type mounting lugs extend laterally outwardly beyond said skirt at its upper end.

33. The combination of claim 32, wherein said internal locking formation includes an anti-rotation element which prevents rotation of said plug and wickholder with respect to a reservoir on which it is mounted.

34. A method of assembly of a liquid refill reservoir, said method comprising the steps of providing a combination plug and wickholder having an upper wick opening through which a wick may project, attaching a cap to said combination plug and wickholder so that a space is formed around said wick opening with said space being sealed from the atmosphere, said cap having at least one downward extension which extends from the upper end of said cap to abut against an upper wall of said combination plug and wickholder, fitting a wick into said wick opening, supplying liquid to a reservoir through an opening therein and then fastening said combination plug and wickholder, with said cap attached thereto, to said reservoir by pressing down on said cap so that downward force on said cap is transmitted through said downward extension to said upper wall of said combination plug and wickholder to snap said plug and wickholder onto said reservoir, with said wick extending into said liquid and said combination plug and wickholder forming a seal with said opening in said reservoir.

35. A method according to claim 34, wherein said wick is fitted into said wick opening before said cap is attached to said combination plug and wickholder.

36. A method according to claim 34, wherein said fastening of said combination plug and wickholder is carried out by forcing it down over the neck of said reservoir with an outwardly facing surface of said plug and wickholder forming a liquid seal with an inner surface of said neck and with an inwardly facing formation on said plug and wickholder interlocking with a corresponding outwardly facing formation on the outside of said neck.

37. A method according to claim 36, wherein said combination plug and wickholder is forced down by pressing on said cap attached thereto.

38. A subcombination comprising:

a plug and wickholder of unitary molded construction which can be fastened onto and sealed with an upwardly projecting neck of a liquid reservoir by the application of a downward force on said plug and wickholder, said plug and wickholder supporting a wick which extends out through an opening therein; and a cap which is removably attached to said plug and wickholder by mutually engaging retaining formations on said cap and on said plug and wickholder, said cap being configured to provide a seal with said plug and wickholder around said wick where it extends out through said opening, said cap also having a top wall and a tubular wall extending down from said top wall to an upper surface of said plug and wickholder to transmit downward forces applied to said cap, down to plug and wickholder without affecting said seal.

39. A subcombination according to claim 38, wherein said upper surface of said plug and wickholder is formed with annular formations which provide a liquid seal when said plug and wickholder is located in an atomizing device and wherein the bottom of said tubular wall is formed with a groove which accommodates said formations to prevent forces transmitted through said tubular wall from being applied to said formations.

* * * * *

UNITED STATES PATENT AND TRADEMARK OFFICE

CERTIFICATE OF CORRECTION

PATENT NO. : 6,446,880 B1
APPLICATION NO. : 09/630882
DATED : September 10, 2002
INVENTOR(S) : David J. Schram et al.

It is certified that error appears in the above-identified patent and that said Letters Patent is hereby corrected as shown below:

Column 11, Line 14: replace “form” with --from--

Signed and Sealed this

Fourth Day of November, 2008

JON W. DUDAS
*Director of the United States Patent and Trademark Office*